United States Patent [19]
Alvarez Berenguer et al.

[11] 4,302,594
[45] Nov. 24, 1981

[54] PROCESS FOR OBTAINING SILANE DERIVATIVES OF SEPIOLITE BY REACTION WITH ALKOXY-SILANES TO IMPROVE THEIR REINFORCING CAPACITY IN POLYMERS

[75] Inventors: Antonio Alvarez Berenguer; Fernando R. Sanchez Montero; Juan J. Aragon Martinez, all of Madrid, Spain

[73] Assignee: Tolsa, S. A., Madrid, Spain

[21] Appl. No.: 132,832

[22] Filed: Mar. 24, 1980

[30] Foreign Application Priority Data

Jun. 28, 1979 [ES] Spain .................................. 482.033

[51] Int. Cl.$^3$ ............................ C07F 7/10; C07F 7/08; C07F 7/18
[52] U.S. Cl. ................................... 556/425; 556/439; 556/427; 556/400; 260/348.12; 260/348.41
[58] Field of Search ............... 556/439, 425, 427, 400; 260/348.12, 348.41

[56] References Cited

U.S. PATENT DOCUMENTS 3,839,385 10/1974 Meiller et al. ........................ 556/439
4,164,509 8/1979 Läufer .................................. 556/400
4,216,024 8/1980 Ivancheu et al. ............... 556/400 X

*Primary Examiner*—Paul F. Shaver

[57] ABSTRACT

The present invention relates to a process for obtaining dilane derivatives of sepiolite by reaction with alkoxy-silanes to improve their reinforcing capacity in polymers, the reaction being carried out by placing the finely divided sepiolite and the alkoxy-silane in close contact, either by vaporization of the latter by the action of heat or by the spraying thereof with nitrogen, the contact taking place in countercurrent in a column of suitable dimensions, the reaction temperature ranging between room temperature and the vaporization temperature of the alkoxy-silane, further characterized in that the silane derivative of the sepiolite is subsequently dried to 110° C. to remove the reaction byproducts.

9 Claims, No Drawings

PROCESS FOR OBTAINING SILANE DERIVATIVES OF SEPIOLITE BY REACTION WITH ALKOXY-SILANES TO IMPROVE THEIR REINFORCING CAPACITY IN POLYMERS

In recent years mineral products of a claylike nature have found an important field of use in mixtures with polymers of different types, the rheological behavior of the latter and, consequently, their mechanical properties varying. However, on numerous occasions they have been used as a simple diluent, some times because only a cheapening of the end product is sought and others because interaction with the polymers was nil.

The group of clays comprises sepiolite, a hydrated magnesium silicate, characterized by its excellent thixotropic and sorbent properties, which has been successfully used in mixtures with diene elastomers and other polymeric systems.

This invention relates to the modification of the surface of the sepiolite by reaction between the silanol groups which are on its surface with alkoxy-silanes, to obtain the corresponding silane derivatives, with which it is possible to provide the inorganic substrate with an organic layer promoting chemical interaction with the polymeric systems, making the organic matrix of the polymer compatible with the inorganic matrix of the mineral, for the achievement of improved mechanical properties.

The process is based on taking advantage of the reactivity of the sepiolite, as a result of the silanol groups which are on its surface, and of the hydration water it contains. The alkoxyl group of the alcoxy-silane is hydrolyzed with the hydration water of the sepiolite and the condensation of a silanol group of the sepiolite with that formed in the silane then takes place.

DESCRIPTION OF THE PROCESS

To carry out this reaction, the sepiolite is very finely ground before entering the reactor. The latter consists of a column of suitable dimensions, where the sepiolite is placed in close contact with the alkoxy-silane, finely sprayed with nitrogen or vaporized by the action of heat. The reaction is carried out between room temperature and the vaporization temperature of the alkoxy-silane, as the case may be. The process is characterized in that it is carried out in countercurrent. On leaving the reactor the silane derivative of sepiolite passes to a tunnel heated at 110° C., where the reaction byproducts are removed.

The reaction which takes place is as follows:

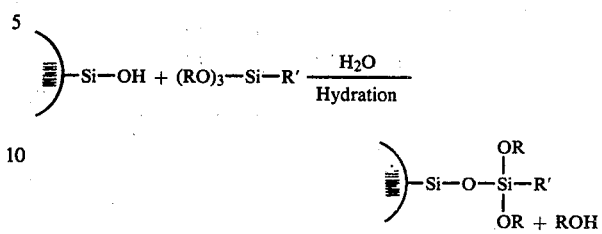

The alkoxy-silanes used are:

| | |
|---|---|
| $H_2C=CH-Si(-O-C_2H_5)_3$ | Vinyl-triethoxy-silane. |
| $H_2C=CH-Si(-O-C_2H_4-O-CH_3)_3$ | Vinyl-tri ($\beta$-methoxy-ethoxy) silane. |
| $H_2C=C(CH_3)-C(O)-O-C_3H_6-Si(-O-CH_3)_3$ | $\gamma$-methacryl-oxypropyl-trimethoxy-silane. |
| $H_2N-C_3H_6-Si(-O-C_2H_5)_3$ | $\gamma$-amino-propyl-triethoxy-silane. |
| $H_2N-C_3H_6-Si(-O-CH_3)_3$ | $\gamma$-amino-propyl-trimethoxy-silane. |
| $H_2C-CH-CH_2-O-C_3H_6-Si(-O-CH_3)_3$ (epoxide) | $\gamma$-glycidil-oxypropyl-trimethoxy-silane. |
| $HS-C_3H_6-Si(-O-CH_3)_3$ | $\gamma$-mercapto-propyl-trimethoxy-silane. |
| $(C_2H_5-O-)_3-Si-(CH_2)_3-S-S-S-S-(CH_2)_3-Si(O-C_2H_5)_3$ | -Bis-(3-triethoxy-silyl-propyl)-tetra-sulfide. |

The thus obtained silane derivatives of sepiolite, which have a reactive group, can be crosslinked with the polymeric chains, with the consequent improvement of the properties thereof.

Some examples are given below of mixtures of silane derivatives of sepiolite in elastomers of the butadiene-styrene type.

The formulation of the mixture used in all the cases was as follows:

| | |
|---|---|
| SBR-1500 Rubber | 100 |
| Silane derivative of sepiolite | 40 |
| Polyglycol 4000 | 4 |
| Zinc oxide | 4 |
| Stearic acid | 2.5 |
| Naphthene plasticizer | 5 |
| Sulfur | 2 |
| Mercaptobenzothiazol disulfide | 1.5 |
| Tetramethyltiuram disulfide | 0.75 |

EXAMPLE NO. 1

Silane derivative of sepiolite, using -mercaptopropyl-trimethoxy-silane.

Alkoxy-silane mols bonded to the sepiolite $= 2.55 \times 10^{-3}$ mols/100 g. of sepiolite.

| | |
|---|---|
| Vulcanization time at 160° C. | 6 minutes |
| Shore A hardness | 63 |
| Ultimate tensile strength (Kg/cm$^2$) | 70 |
| Elongation at break (%) | 370 |
| 300% modulus (Kg/cm$^2$) | 61 |

EXAMPLE NO. 2

Silane derivative of sepiolite, using -mercaptopropyl-trimethoxy-silane.

Alkoxy-silane moles bonded to the sepiolite $= 7.65 \times 10^{-3}$ moles/100 g. of sepiolite.

| Vulcanization time at 160° C. | 6 minutes |
|---|---|
| Shore A hardness | 65 |
| Ultimate tensile strength (Kg/cm$^2$) | 87 |
| Elongation at break (%) | 240 |
| 200% modulus (Kg/cm$^2$) | 76 |

EXAMPLE NO. 3

Silane derivative of sepiolite, using BIS-(3-triethoxysilyl-propyl)-tetrasulfide.

Alkoxy-silane moles bonded to the sepiolite $= 9.29 \times 10^{-4}$ moles/100 g. of sepiolite.

| Vulcanization time at 160° C. | 7 minutes |
|---|---|
| Shore A hardness | 63 |
| Ultimate tensile strength (Kg/cm$^2$) | 63 |
| Elongation at break (%) | 380 |
| 300% modulus (Kg/cm$^2$) | 54 |

EXAMPLE NO. 4

Silane derivative of sepiolite, using BIS-(3-triethoxysilyl-propyl)-tetrasulfide.

Alkoxy-silane moles bonded to the sepiolite $= 2.78 \times 10^{-3}$ moles/100 g. of sepiolite.

| Vulcanization time at 160° C. | 7 minutes |
|---|---|
| Shore A hardness | 66 |
| Ultimate tensile strength (Kg/cm$^2$) | 85 |
| Elongation at break (%) | 320 |
| 200% modulus (Kg/cm$^2$) | 63 |

Test standards

The different mixtures were made in a 150×300 mm. roll mill (friction ratio: 1:1.2).

The physical tests were carried out at room temperature, in accordance with the following standards: ultimate tensile strength, elongation at break and modulus, on a ring test piece, in accordance with UNE 53.510 first R. Shore A hardness, in accordance with UNE 53.130. The vulcanization of the different mixtures was carried out at 160° C., in accordance with the optimum times recorded on a Monsanto M-100 rheometer.

What is claimed is:

1. A process for obtaining silane derivatives of sepiolite by reaction with alkoxy-silanes, characterized by the steps of contacting finely-divided sepiolite in hydrated form with a vaporized alkoxy-silane in countercurrent vertical flow at temperatures between room temperature and the normal boiling point of the alkoxy-silane, followed by heating the sepiolite at 110° C. to remove the reaction byproducts.

2. Process for obtaining silane derivatives of sepiolite by reaction with alkoxy-silanes to improve their reinforcing capacity in polymers, according to claim 1, characterized in that vinyl-triethoxy-silane is used as the reacting substance.

3. Process for obtaining silane derivatives of sepiolite by reaction with alkoxy-silanes to improve their reinforcing capacity in polymers, according to claim 1, characterized in that vinyl-tri ($\beta$-methoxy-ethoxy)-silane is used as the reacting substance.

4. Process for obtaining silane derivatives of sepiolite by reaction with alkoxy-silanes to improve their reinforcing capacity in polymers, according to claim 1, characterized in that $\gamma$-methacryl-oxypropyl-trimethoxysilane is used as the reacting substance.

5. Process for obtaining silane derivatives of sepiolite by reaction with alkoxy-silanes to improve their reinforcing capacity in polymers, according to claim 1, characterized in that $\gamma$-amino-propyl-triethoxy-silane is used as the reacting substance.

6. Process for obtaining silane derivatives of sepiolite by reaction with alkoxy-silanes to improve their reinforcing capacity in polymers, according to claim 1, characterized in that $\gamma$-amino-propyl-trimethoxy-silane is used as the reacting substance.

7. Process for obtaining silane derivatives of sepiolite by reaction with alkoxy-silanes to improve their reinforcing capacity in polymers, according to claim 1, characterized in that $\gamma$-glycidyl-oxypropyl-trimethoxy-silane is used as the reacting substance.

8. Process for obtaining silane derivatives of sepiolite by reaction with alkoxy-silanes to improve their reinforcig capacity in polymers, according to claim 1, characterized in that $\gamma$-mercapto-propyl-trimethoxy-silane is used as the reacting substance.

9. Process for obtaining silane derivatives of sepiolite by reaction with alkoxy-silanes to improve their reinforcing capacity in polymers, according to claim 1, characterized in that Bis-(3-triethoxy-silyl-propyl)tetrasulfide is used as the reacting substance.

* * * * *